United States Patent [19]

Becker et al.

[11] 4,285,724
[45] Aug. 25, 1981

[54] CONTINUOUS PRODUCTION OF FINELY DIVIDED ZIRCONIUM POWDER

[75] Inventors: Aaron J. Becker, Monroeville; Don R. Careatti, Apollo, both of Pa.

[73] Assignee: Aluminum Company of America, Pittsburgh, Pa.

[21] Appl. No.: 94,654

[22] Filed: Nov. 15, 1979

[51] Int. Cl.³ .......................................... C22B 34/14
[52] U.S. Cl. ...................................... 75/84.4; 75/84.5
[58] Field of Search ................................ 75/84.5, 84.4

[56] References Cited

U.S. PATENT DOCUMENTS

| 2,214,211 | 9/1940 | Von Zeppelin . | |
| 2,839,385 | 6/1958 | Olson | 75/84.5 |
| 2,861,791 | 11/1958 | Chisholm et al. | 75/84.5 |
| 2,942,969 | 6/1960 | Doyle | 75/84.5 |
| 3,692,294 | 9/1972 | Ishimatsu | 75/84.5 |

FOREIGN PATENT DOCUMENTS 810428 3/1959 United Kingdom .
558059 6/1977 U.S.S.R. .

Primary Examiner—Brooks H. Hunt
Attorney, Agent, or Firm—Glenn E. Klepac

[57] ABSTRACT

Process for production of finely divided zirconium powder by reaction of solid magnesium with $ZrCl_4$ in a molten salt bath maintained at a temperature below the melting point of magnesium. A preferred salt bath contains about 8 mole % $ZrCl_4$ in an equimolar mixture of KCl and NaCl and is maintained at about 625° C. Gaseous $ZrCl_4$ and solid magnesium are continuously fed to a lower portion of the bath, the bath is continuously agitated, and bath containing $MgCl_2$ is continuously removed. Zirconium powder recovered from the bath is generally spherical with a median particle size of about 2.2 μm and is suitable for use in rapid rise time thermal batteries.

12 Claims, 4 Drawing Figures

CONTINUOUS PRODUCTION OF FINELY DIVIDED ZIRCONIUM POWDER

BACKGROUND OF THE INVENTION

The Government has rights in this invention pursuant to Contract F33615-76-C-5440, Project No. 277-6, awarded by the United States Air Force.

FIELD OF THE INVENTION

The present invention relates to processes for production of finely divided zirconium powders used as heat sources for rapid rise time thermal batteries, which comprise an essential part of the fusing in missiles.

DESCRIPTION OF THE PRIOR ART

Production of zirconium powder for use in thermal batteries in this country is presently based upon a batch process using the reaction $$ZrO_2 + 2Mg \rightarrow Zr + 2MgO$$

Finely divided zirconium dioxide is blended with an excess of magnesium, inserted in a large retort and heated above 1000° C. whereupon a highly exothermal reaction is initiated. Although the reaction usually persists for a relatively short time, the retort is maintained at an elevated temperature for two to five hours. The inhomogeneous reaction product is removed from the retort, leached with hydrochloric acid and then washed with tap water.

While processes for production of zirconium metal from $ZrCl_4$ are disclosed in several prior art patents, the prior art fails to teach a continuous or semicontinuous process for recovery of finely divided zirconium powder from a molten salt bath. There are at least four patents describing production of zirconium in a molten salt by reduction of $ZrCl_4$ with a metal, but none of these patents teaches a process that is entirely suitable for production of finely divided zirconium powder.

For example, Von Zeppelin et al U.S. Pat. No. 2,214,211 recognizes the value of selecting a molten salt for performing the reaction. Actual molten salt systems mentioned are $KCl$-$ZrCl_4$ and $NaCl$-$ZrCl_4$. However, Von Zeppelin et al operated at 800° C., performed their reaction in batches rather than as a continuous or semicontinuous process and did not provide for stirring of their reaction mixture. No information is available on the nature of the product.

In British Patent No. 810,428, issued to National Distillers and Chemical Corporation, gaseous $ZrCl_4$ is reacted with molten sodium at temperatures of between 325° and 400° C. to form $ZrCl_2$ and $NaCl$. The product is placed in a salt bath and reacted with molten sodium at 900° C. This is a batch process, and no information is available as to particle size of the zirconium metal produced thereby.

U.S. Pat. No. 2,942,969, issued to G. W. Doyle, teaches a continuous process for production of zirconium compacts by reaction of $ZrCl_4$ with a sodium-magnesium alloy in a mixture of molten $NaCl$ and $MgCl_2$ at 600° to 900° C., preferably 650° to 800° C. The reacting alloy contains a ratio of 1.25 to 7 parts sodium to one part magnesium and is a liquid at temperatures above 600° C. The reaction is run in a ram-type reactor, with zirconium-rich compacts being expelled through a bottom opening for further purification in an electric arc furnace.

Particle size distribution of zirconium metal produced by the process of the Doyle patent has been reported by G. Weise, ZEITSCHRIFT FUR METALLKUNDE 56 (1965, No. 3), pp. 186–196. Weise found average particle sizes as small as 13.2 μm when the reaction was performed at 850° C. in a 70% $NaCl$-30% $MgCl_2$ salt mixture. Even larger particle sizes were obtained under other reaction conditions tried by Weise.

In Aleksandrovskiy et al USSR Patent No. 558,059, issued June 14, 1977, it is claimed that in the reduction of $ZrCl_4$ by sodium metal at temperatures of 650° to 700° C. in a mixed salt bath comprising $NaCl$, $KCl$, $ZrCl_4$ and $MgCl_2$, the fraction of zirconium powder fines can be increased by increasing the concentration of $MgCl_2$ in the bath. In a bath containing 30 wt. % $MgCl_2$, production of powder including 78.4% of the 0–10 μm fraction is claimed. However, the quantity of metallic sodium used as a reductant in this patent appears to be capable of reducing the 30 wt. % $MgCl_2$ to as little as 2.4 wt. %.

In all of the known prior art, only the Aleksandrovskiy et al patent mentions production of zirconium powder having an average particle size of less than 10 μm. It is also of interest that the prior art fails to appreciate the importance of using a solid reducing agent rather than a liquid in producing finely divided zirconium powder.

OBJECTS AND ADVANTAGES OF THE INVENTION

The principal objective of the present invention is to produce finely divided zirconium powder suitable for use in rapid rise time thermal batteries.

It is a related objective of the invention to provide a continuous or semicontinuous process for production of finely divided zirconium powder by reduction of $ZrCl_4$ in a molten salt bath.

A principal advantage of the present invention is that zirconium powder produced thereby consistently has a median particle size of less than about 4 μm and is generally spherical in shape.

Another advantage of the invention is that the present process for production of finely divided zirconium powder can be performed as a continuous or semicontinuous operation, thereby reducing costs when performed on a production-scale basis.

BRIEF DESCRIPTION OF THE DRAWINGS

The foregoing objects and advantages of the invention are best understood with reference to the following detailed description of the invention considered in conjunction with the drawings wherein.

SUMMARY OF THE INVENTION

In accordance with the present invention, there is provided a molten salt bath comprising about 5 to 95 mole % $ZrCl_4$, about 0 to 45 mole % $MgCl_2$ and the remainder KCl or NaCl or mixtures thereof. The bath is maintained at a temperature greater than its solidus temperature and less than the melting point of magnesium (650° C.). Gaseous $ZrCl_4$ and solid magnesium are simultaneously fed to the bath, and the reaction produces $MgCl_2$ and finely divided zirconium powder having a median particle size of less than about 4 μm. The zirconium powder produced is then removed from the bath.

The process is preferably carried out at temperatures of 540° to 649° C. and optimally at 625° C. in a molten salt bath comprising about 40 to 50 mole % KCl, about 40 to 50 mole % NaCl, about 5 to 20 mole % $ZrCl_4$ and no $MgCl_2$. In a particularly preferred example, the $ZrCl_4$ concentration is 8.4 mole %. Gaseous $ZrCl_4$ and solid magnesium powder are both fed continuously to a lower portion of the bath, and the bath is constantly agitated. Magnesium powder fed to the bath is intermixed with an equimolar quantity of NaCl or KCl or mixtures thereof. Excess salt produced by the reaction is removed together with zirconium powder.

Solid zirconium powder recovered from the particularly preferred process has been found to be generally spherical with a median particle size of about 2.2 μm. The powder is suitable for use in rapid rise time thermal batteries.

DETAILED DESCRIPTION OF A PREFERRED EMBODIMENT

Figure 1:
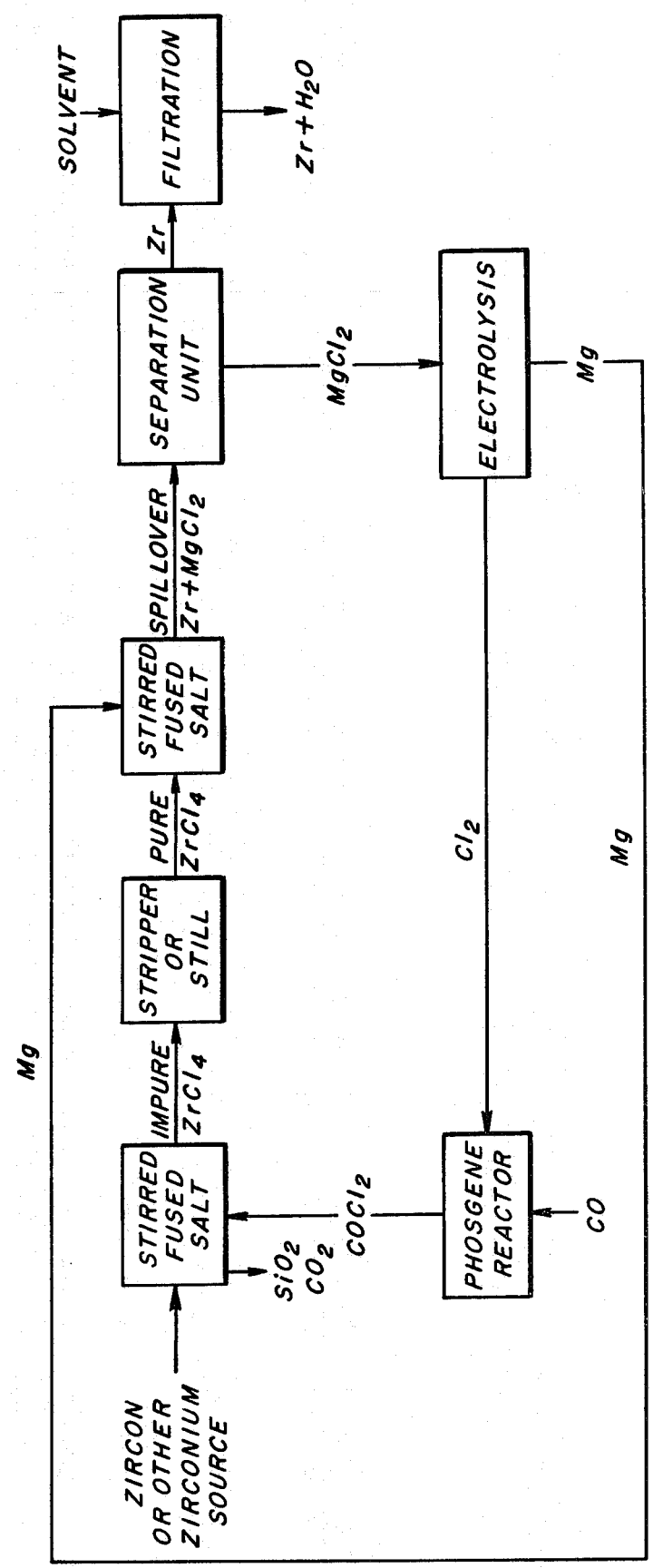
FIG. 1 is a flow sheet diagram of a continuous process for production of zirconium powder from zircon or other zirconium source, in accordance with the invention.

A schematic flow sheet diagram of a comprehensive process for zirconium powder production, including the process of the present invention, is shown in FIG. 1. In this comprehensive process zircon is reacted with phosgene or other chlorine source in a stirred fused salt bath. Impure $ZrCl_4$ produced by this chlorination step is purified and then reacted with solid Mg in accordance with the present invention. Spillover $MgCl_2$ obtained during zirconium powder production can be electrolyzed with $Cl_2$ being recycled to the chlorination step and solid magnesium being returned for production of more zirconium powder. The only feeds to the system shown in FIG. 1 are zircon, carbon monoxide and electric power. The materials extracted are zirconium, silica and $CO_2$.

Figure 2:
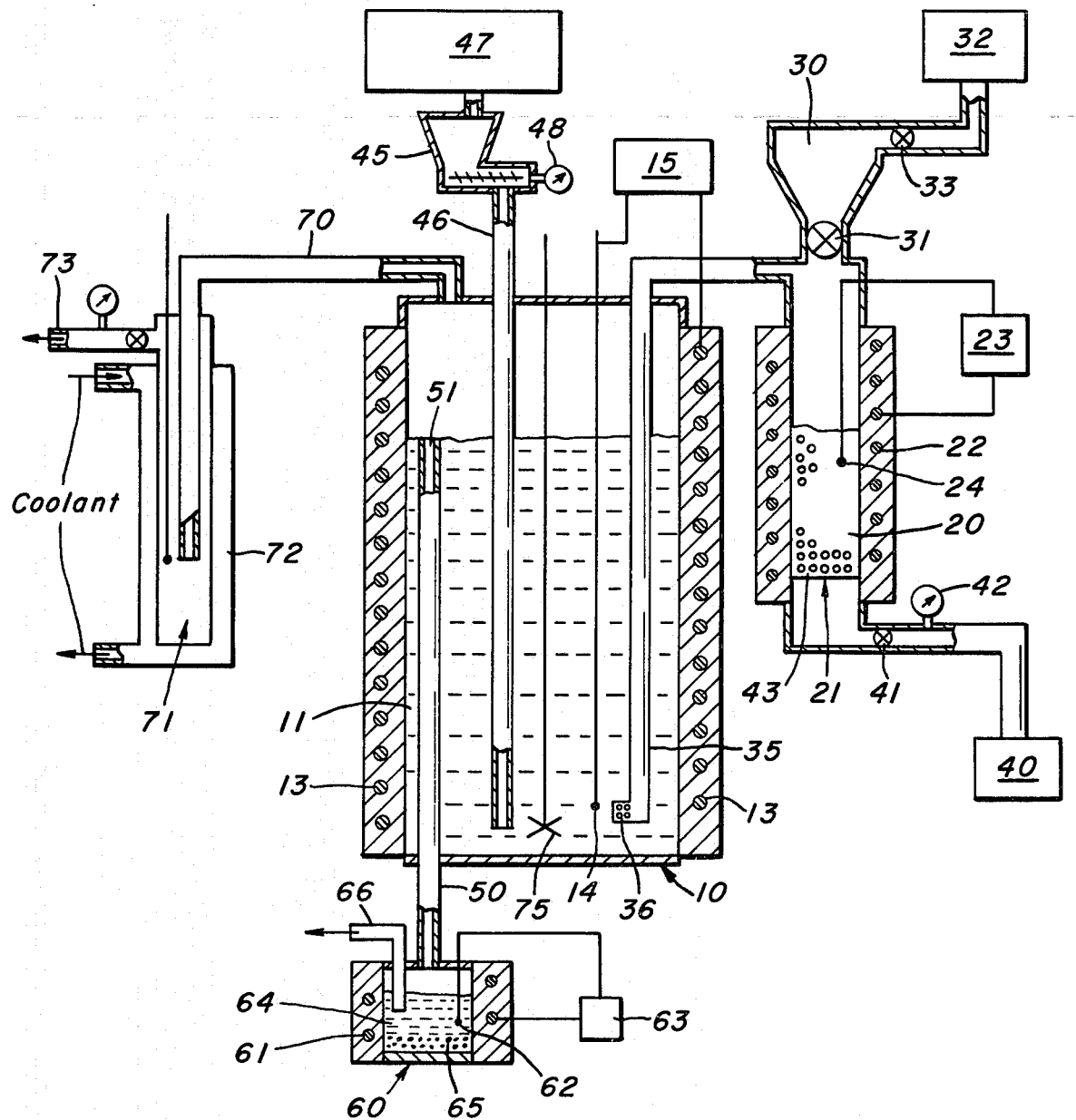
FIG. 2 is a schematic diagram of apparatus for continuous production of zirconium powder from $ZrCl_4$ and solid magnesium, in accordance with the invention.

In FIG. 2, there is shown a schematic diagram of an apparatus for continuous production of finely divided zirconium powder in accordance with a preferred process of the invention. Centrally located is a reactor 10 defining a generally cylindrical reaction chamber 11 lined by low nickel 304 stainless steel. The floor of the chamber 11 has an area of 57 cm², and the chamber 11 is initially loaded with molten salt bath to a height of 46 cm.

The reactor 10 is heated by a four-element furnace 13 having a diameter of 12.7 cm and a 61 cm hot zone. Temperature is maintained within preselected limits by a thermocouple 14 linked to a controller 15 and to the furnace 13.

Solid $ZrCl_4$ is inserted into a cell 20 in a generally cylindrical subliming tube or sublimer 21. The cell 20 has an inner diameter of 5 cm and a height of 76 cm. The sublimer 21 is heated by an electric furnace 22, and temperature is fixed within 5° C. by a controller 23 linked to a thermocouple 24 inserted within the cell 20 and to the furnace 22. A reservoir 30 of solid powdered $ZrCl_4$ is maintained directly above the sublimer 21. A hand-operated valve 31 controls the quantity of $ZrCl_4$ released into the sublimer 21. The reservoir 30 is purged by a tank 32 of inert gas (He or Ar) linked thereto by a valve 33.

Gaseous $ZrCl_4$ is fed to a lower portion of the molten salt bath held in the chamber 11 through an elongated gas dispenser or dispensing tube 35. A lowermost end portion 36 of the dispensing tube 35 is perforated to present the gaseous $ZrCl_4$ to the bath as a multiplicity of small bubbles.

The sublimer 21 is purged by argon gas supplied by a tank 40 through a valve 41. A pressure gauge 42 maintains the pressure at a preselected level. The argon gas reaches solid $ZrCl_4$ in the sublimer 21 through a frit 43 provided with a multiplicity of openings.

Control of $ZrCl_4$ feed rate to the reactor 21 is based upon the equation $$P(ZrCl_4) = \frac{dN(ZrCl_4)/dt}{dN(ZrCl_4)/dt + dN(Ar)/dt}$$

where $P(ZrCl_4)$ is the partial pressure of $ZrCl_4$ in the sublimer, $dN(ZrCl_4)/dt$ is the molar feed rate of $ZrCl_4$ and $dN(Ar)/dt$ is the molar feed rate of argon through the sublimer 21. The feed rate of $ZrCl_4$ can be increased either by increasing the partial pressure of $ZrCl_4$ or by increasing the flow rate of argon. In order to minimize any chance of backflowing molten salt through the dispensing tube 35, a steady high flow rate of argon was maintained, and changes in the feed rate of $ZrCl_4$ were made by varying temperature in the sublimer 21.

Powdered magnesium is fed to a lower portion of the reactor 10 through a screw feeder 45 and an elongated tube 46. The screw feeder 45 is purged by argon gas supplied by a tank 47. A pressure gauge 48 maintains the gas pressure at a preselected level.

A vertically adjustable overflow pipe 50 has an upwardly opening top end 51 at the upper level of the molten salt bath in the reaction chamber 11. The overflow pipe 50 empties into a product collecting tank 60 surrounded by heating coils 61. A thermocouple 62 in the tank 60 is coupled to a temperature controller 63 and to the heating coils 61 for temperature control. Molten salts 64 are separated from the zirconium powder 65 through a siphon 66.

Excess gaseous $ZrCl_4$ leaves the reaction chamber 11 through a heated outlet tube 70 leading to a condenser 71. A coolant in an outer jacket 72 encircling the condenser 71 maintains temperature sufficiently low to remove substantially all $ZrCl_4$ from gas leaving the condenser 71 through a gas exhaust tube 73.

A mechanical stirrer 75 agitates the molten salt bath. In the preferred process described below, the stirrer 75 was rotated at a rate of 1000 rpm.

EXAMPLE

In a particularly preferred process of the invention, the reactor 10 was filled to a height of 46.0 cm with a bath having the following initial composition: NaCl 1407.5 g (24.1 moles); KCl 1792.5 g (24.0 moles); and $ZrCl_4$ 1026.0 g (4.4 moles). Composition of the bath in mole percent was NaCl 45.9%; KCl 45.7% and $ZrCl_4$ 8.4%. Bath temperature was 625° C.

The sublimer 21 was heated to a temperature of 295° C., and the feed rate of gaseous $ZrCl_4$ was 0.002 mole/- min at a partial pressure of 0.26 atmosphere. Gas residence time of the ZrCl₄ in the reaction chamber 11 was 1.1 minute. Powdered Mg was fed through the screw feeder 45 and associated tube 46 at a rate of 0.004 mole/min.

When the reaction was carried out for a total run time of 2,747 minutes, the yield of zirconium powder was 268.5 grams. Total recovery, based upon magnesium fed to the reaction, was 55.3%.

Figure 3A:
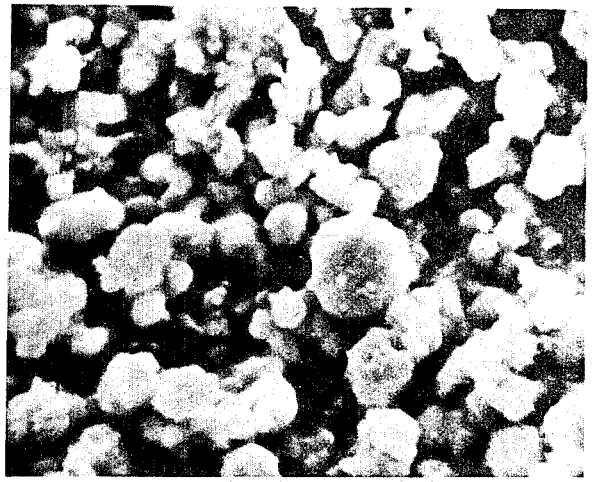
FIGS. 3a and 3b are photomicrographs at magnifications of 2000× and 5000×, respectively, of a preferred product obtained through practice of the present invention.
Figure 3B:
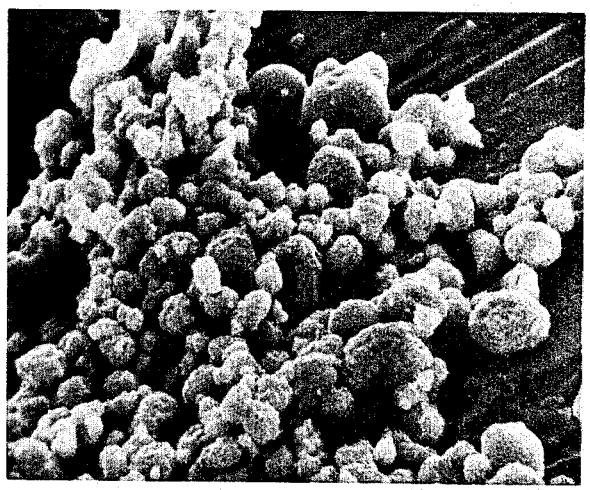

The zirconium powder recovered was in the form of roughened, generally spherical particles, as shown in the scanning electron microscope photographs of FIGS. 3a and 3b. The powder had a median particle size of about 2.2 μm. Particle size distribution as measured by Coulter counter is shown in Table I. The process of the invention is felt to be consistently capable of producing powder having a median particle size of less than about 4 μm.

TABLE I

Particle size distribution of zirconium powder (percentage of particles less than a given diameter)

| Diameter (μm) | Percent Less Than | Diameter (μm) | Percent Less Than |
|---|---|---|---|
| 12.68 | 100.00 | 5.23 | 93.27 |
| 12.26 | 98.32 | 5.05 | 92.20 |
| 11.86 | 96.80 | 4.87 | 90.91 |
| 11.47 | 95.43 | 4.70 | 90.24 |
| 11.09 | 95.43 | 4.53 | 89.12 |
| 10.73 | 95.43 | 4.36 | 88.04 |
| 10.37 | 95.43 | 4.20 | 86.73 |
| 10.03 | 95.43 | 4.04 | 85.12 |
| 9.70 | 95.43 | 3.89 | 83.79 |
| 9.38 | 95.43 | 3.74 | 81.87 |
| 9.07 | 95.43 | 3.59 | 80.42 |
| 8.77 | 95.43 | 3.44 | 78.28 |
| 8.48 | 95.43 | 3.30 | 76.00 |
| 8.20 | 95.43 | 3.16 | 74.08 |
| 7.93 | 95.43 | 3.02 | 71.08 |
| 7.66 | 95.43 | 2.88 | 68.61 |
| 7.40 | 95.43 | 2.74 | 65.89 |
| 7.16 | 95.43 | 2.61 | 62.39 |
| 6.92 | 95.13 | 2.47 | 58.59 |
| 6.68 | 94.85 | 2.33 | 53.97 |
| 6.46 | 94.85 | 2.18 | 48.81 |
| 6.24 | 94.63 | 2.03 | 43.39 |
| 6.02 | 93.83 | 1.87 | 36.81 |
| 5.82 | 93.83 | 1.70 | 29.31 |
| 5.62 | 93.66 | 1.51 | 20.90 |
| 5.42 | 93.66 | 1.28 | 10.62 |

The example described herein was run as a batch process with none of the zirconium powder or salt bath being removed until after the reactor 10 was cooled, and the reaction was stopped. The overflow pipe 50 and product collecting tank 60 were not used.

The zirconium powder produced in this example had a minimum ignition temperature in air of 328° C., and an open train burn time of 6.0 seconds. The powder had a weight gain upon ignition of 23.2%. Minimum ignition energy was 0.5 μJ.

A qualitative spectrographic analysis of the powder revealed a major portion of zirconium with the following levels of impurities:

| Element | % by Weight |
|---|---|
| Al | .04 |
| Ba | .05 |
| Ca | .1 |
| Cr | 1.0 |
| Cu | .02 |
| Fe | 2.0 |

-continued

| Element | % by Weight |
|---|---|
| Mg | .5 |
| Mn | .02 |
| Mo | .04 |
| Ni | 2.0 |
| Sb | .01 |
| Si | .2 |
| Ti | .05 |

While the process of the present invention is described above with reference to a single particularly preferred embodiment wherein finely divided zirconium powder is produced in a batch operation, the invention is more broadly applicable to production of zirconium powder by a continuous or semicontinuous process wherein solid magnesium powder is reacted with gaseous ZrCl₄ in a molten salt bath containing ZrCl₄. The molten bath may contain 0 to 45 mole % MgCl₂ with a bath containing no MgCl₂ being preferred. Concentration of ZrCl₄ in the bath may vary from 5 to 95 mole %, preferably 5 to 20 mole %. The remainder of the salt bath comprises KCl or NaCl or mixtures thereof. Salt baths initially containing about 40 to 50 mole % KCl and about 40 to 50 mole % NaCl, preferably in an equimolar mixture, are preferred.

The salt bath must be maintained at a temperature greater than its solidus temperature and less than the melting point of magnesium. A temperature range of about 216° to 649° C. is theoretically possible. In the lowermost temperature regions, the salt bath would contain a major proportion of ZrCl₄ with minor amounts of KCl, NaCl and MgCl₂. However, operating temperatures of about 540° to 649° C. are preferred in order to take advantage of faster reaction rates at elevated temperatures. A particularly preferred bath temperature is 625° C.

When the process of the invention is operated as a continuous or semicontinuous process, gaseous ZrCl₄ is fed to a lower portion of the bath through the dispensing tube 35. Powdered solid Mg is fed to a lower portion of the bath through the screw feeder 45 and tube 46 together with an equimolar quantity of KCl or NaCl or mixtures thereof. Feeding KCl or NaCl to the bath together with the magnesium is intended to maintain the bath concentration of MgCl₂ at a constant level. A bath concentration of less than one mole % MgCl₂ is preferred, the concentration of MgCl₂ optimally being as low as possible.

The stirrer is operated at about 1000 rpm to maintain the bath in an agitated state. As zirconium powder is formed, a part of the bath and powder are removed through the open end 51 of the overflow pipe 50. Height of the open end 51 is adjusted to seek a level at which the greatest concentration of powder is present. Molten MgCl₂ removed along with the zirconium powder may be electrolyzed to form magnesium powder that is recycled to the reaction.

While the foregoing description of our invention has been made with reference to several examples of preferred operating ranges, numerous changes and modifications can be made therein without departing from the spirit and scope of the following claims.

What is claimed is:

1. A process for production of finely divided Zr powder by reaction of ZrCl₄ with Mg, comprising the steps of (a) providing a molten salt bath comprising about 5 to 95 mole % $ZrCl_4$, about 0 to 45 mole % $MgCl_2$, and the remainder KCl, NaCl or mixtures of KCl and NaCl;

(b) maintaining the bath at a temperature greater than the solidus temperature of the bath and less than the melting point of Mg, said temperature being about 540° to 649° C.;

(c) feeding gaseous $ZrCl_4$ to a lower portion of the bath;

(d) reacting the $ZrCl_4$ with solid Mg to form $MgCl_2$ and Zr powder; and (e) separating the Zr powder from the bath.

2. The process of claim 1 wherein the bath initially contains essentially no $MgCl_2$, further comprising (g) removing $MgCl_2$ from the bath to maintain the concentration of $MgCl_2$ in the bath below one mole %.

3. The process of claim 1 wherein the Mg is fed to the bath together with an equimolar quantity of KCl or NaCl or mixtures thereof.

4. The process of claim 1 further comprising continuously agitating the bath to promote reaction between the solid Mg and $ZrCl_4$.

5. The process of claim 1 wherein the Zr powder has a median particle size of less than about 4 $\mu$m.

6. The process of claim 1 wherein the gaseous $ZrCl_4$ has a gas residence time of about 1.1 minute or less in the bath.

7. The process of claim 1 wherein the gaseous $ZrCl_4$ and the solid Mg are both fed to a lower portion of the bath.

8. A process for continuous production of finely divided Zr powder, comprising the process of claim 1 wherein gaseous $ZrCl_4$ and solid Mg are both fed continuously to a lower portion of the bath, the bath initially contains essentially no $MgCl_2$, $MgCl_2$ is continuously removed from the bath to maintain the $MgCl_2$ concentration below one mole %, and the bath is continuously agitated.

9. The process of claim 1 wherein the Zr powder has a particle size of about 12.68 $\mu$m or less.

10. The process of claim 1 wherein the solid Mg is finely divided.

11. The process of claim 1 wherein the bath comprises about 40 to 50 mole % KCl, about 40 to 50 mole % NaCl, about 5 to 20 mole % $ZrCl_4$, and less than one mole % $MgCl_2$.

12. The process of claim 11 wherein the bath consists essentially of about 46 mole % KCl, about 46 mole % NaCl, and about 8 mole % $ZrCl_4$, and is maintained at a temperature of about 625° C.

* * * * *